(12) United States Patent
Germon et al.

(10) Patent No.: US 10,234,093 B2
(45) Date of Patent: Mar. 19, 2019

(54) OPTICAL WAVEGUIDE WITH A REFLECTIVE PATTERN FOR PROPAGATING A LIGHT BEAM

(71) Applicant: Valeo Vision, Bobigny (FR)

(72) Inventors: Francois Germon, Fontaine Guerin (FR); Jean-Francois Doha, Saint Barthelemy d'Anjou (FR); Boubacar Sagna, Sartrouville (FR)

(73) Assignee: VALEO VISION, Bobigny (FR)

( * ) Notice: Subject to any disclaimer, the term of this patent is extended or adjusted under 35 U.S.C. 154(b) by 476 days.

(21) Appl. No.: 14/888,247

(22) PCT Filed: May 21, 2014

(86) PCT No.: PCT/EP2014/060479
§ 371 (c)(1),
(2) Date: Oct. 30, 2015

(87) PCT Pub. No.: WO2014/187876
PCT Pub. Date: Nov. 27, 2014

(65) Prior Publication Data
US 2016/0069526 A1 Mar. 10, 2016

(30) Foreign Application Priority Data
May 22, 2013 (FR) ...................................... 13 54570

(51) Int. Cl.
*F21V 8/00* (2006.01)
*F21S 41/24* (2018.01)
(Continued)

(52) U.S. Cl.
CPC ............ *F21S 41/24* (2018.01); *F21S 43/239* (2018.01); *F21S 43/245* (2018.01);
(Continued)

(58) Field of Classification Search
CPC .. G02B 6/0036; G02B 6/0043; G02B 6/0055; G02B 6/0061
See application file for complete search history.

(56) References Cited

U.S. PATENT DOCUMENTS 6,530,671 B2 *  3/2003  Taniguchi ............ G02B 6/0036
                                                          349/65
6,659,615 B2 * 12/2003  Umemoto ............ G02B 6/0038
                                                          359/580

(Continued)

FOREIGN PATENT DOCUMENTS

DE      102008034052 A1    1/2010
EP         2476947 A2      7/2012
(Continued)

*Primary Examiner* — Alexander K Garlen
*Assistant Examiner* — Colin J Cattanach
(74) *Attorney, Agent, or Firm* — Oblon, McClelland, Maier & Neustadt, L.L.P.

(57) ABSTRACT

An optical waveguide for the propagation of a light beam adapted to travel by successive total reflections off the faces of the waveguide to an output face where the light beam is refracted. One of the faces of the waveguide forms, facing towards the output face, a support face for a pattern extending across the main direction of the beam to divert same towards the output face. According to a characterizing feature of the invention, the pattern is a bifunctional reflective pattern that is integral with the support face, having three portions including end portions formed by cone portions between which there is interposed an intermediate portion that comprises two facets that meet at a top edge, which is not parallel to the support face for the patterns.

22 Claims, 4 Drawing Sheets

(51) Int. Cl.
*F21S 43/239* (2018.01)
*F21S 43/245* (2018.01)

(52) U.S. Cl.
CPC ......... *G02B 6/0036* (2013.01); *G02B 6/0038* (2013.01); *G02B 6/0043* (2013.01); *G02B 6/0055* (2013.01); *G02B 6/0061* (2013.01)

(56) References Cited

U.S. PATENT DOCUMENTS

| | | |
|---|---|---|
| 6,712,481 B2 | 3/2004 | Parker et al. |
| 6,749,312 B2 | 6/2004 | Parker et al. |
| 6,755,547 B2 | 6/2004 | Parker |
| 7,004,611 B2 | 2/2006 | Parker et al. |
| 7,077,544 B2 | 7/2006 | Parker |
| 7,160,015 B2 | 1/2007 | Parker |
| 7,165,873 B2 | 1/2007 | Parker |
| 7,178,965 B2 | 2/2007 | Parker |
| 7,195,389 B2 | 3/2007 | Parker et al. |
| 7,226,196 B2 | 6/2007 | Parker et al. |
| 7,300,194 B2 | 11/2007 | Parker |
| 7,322,730 B2 | 1/2008 | Parker |
| 7,354,184 B2 | 4/2008 | Parker |
| 7,357,553 B2 | 4/2008 | Parker |
| 7,374,305 B2 | 5/2008 | Parker |
| 7,384,177 B2 | 6/2008 | Parker |
| 7,404,660 B2 | 7/2008 | Parker |
| 7,404,661 B2 | 7/2008 | Parker et al. |
| 7,434,973 B2 | 10/2008 | Parker et al. |
| 7,434,974 B2 | 10/2008 | Parker |
| 7,467,887 B2 | 12/2008 | Parker |
| 7,537,370 B2 | 5/2009 | Parker |
| 7,703,967 B2 | 4/2010 | Parker |
| 7,726,854 B2 | 6/2010 | Bourdin et al. |
| 7,736,043 B2 | 6/2010 | Parker |
| 7,963,687 B2 | 6/2011 | Parker |
| 8,123,393 B2 | 2/2012 | Parker |
| 8,820,991 B2 | 9/2014 | Godbillon et al. |
| 2002/0039155 A1* | 4/2002 | Umemoto ............ G02B 6/0038 349/61 |
| 2002/0141174 A1 | 10/2002 | Parker et al. |
| 2003/0007344 A1 | 1/2003 | Parker |
| 2003/0123245 A1 | 7/2003 | Parker et al. |
| 2003/0123246 A1 | 7/2003 | Parker |
| 2003/0123247 A1 | 7/2003 | Parker et al. |
| 2003/0202338 A1 | 10/2003 | Parker |
| 2004/0012946 A1 | 1/2004 | Parker et al. |
| 2004/0080927 A1 | 4/2004 | Parker et al. |
| 2004/0165372 A1 | 8/2004 | Parker |
| 2004/0240194 A1* | 12/2004 | Lao ...................... G02B 6/0043 362/627 |
| 2005/0007759 A1 | 1/2005 | Parker |
| 2005/0094418 A1 | 5/2005 | Parker |
| 2005/0111238 A1 | 5/2005 | Parker |
| 2005/0111241 A1 | 5/2005 | Parker |
| 2005/0207154 A1 | 9/2005 | Parker |
| 2005/0207178 A1 | 9/2005 | Parker |
| 2005/0213322 A1 | 9/2005 | Parker |
| 2005/0213323 A1 | 9/2005 | Parker |
| 2005/0213349 A1 | 9/2005 | Parker |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0158906 A1 | 7/2006 | Parker |
| 2006/0232965 A1 | 10/2006 | Parker |
| 2006/0262567 A1 | 11/2006 | Parker |
| 2006/0274554 A1 | 12/2006 | Parker |
| 2006/0274555 A1 | 12/2006 | Parker |
| 2007/0103933 A1 | 5/2007 | Parker |
| 2007/0121334 A1 | 5/2007 | Bourdin et al. |
| 2007/0133224 A1 | 6/2007 | Parker et al. |
| 2007/0147087 A1 | 6/2007 | Parker et al. |
| 2007/0153549 A1 | 7/2007 | Parker |
| 2007/0189033 A1* | 8/2007 | Watanabe ............ G02B 6/0038 362/606 |
| 2007/0274097 A1* | 11/2007 | Chen ..................... G02B 6/0036 362/609 |
| 2009/0097274 A1* | 4/2009 | Shinohara ............ G02B 5/0215 362/619 |
| 2009/0279324 A1* | 11/2009 | Chen ..................... G02B 6/0036 362/616 |
| 2010/0026703 A1* | 2/2010 | Parker .................. G02B 6/0046 345/589 |
| 2010/0073954 A1 | 3/2010 | Gebauer |
| 2010/0157624 A1* | 6/2010 | Liao ..................... G02B 6/0035 362/611 |
| 2010/0172151 A1 | 7/2010 | Parker |
| 2011/0222310 A1 | 9/2011 | Parker |
| 2012/0224385 A1 | 9/2012 | Godbillon et al. |
| 2013/0051075 A1* | 2/2013 | Fujita ................... G02B 6/0038 362/613 |
| 2014/0177277 A1* | 6/2014 | Wang He .......... G02F 1/133604 362/619 |
| 2014/0321137 A1* | 10/2014 | Chen .................... F21S 48/1241 362/511 |

FOREIGN PATENT DOCUMENTS

| | | |
|---|---|---|
| FR | 2891891 A1 | 4/2007 |
| FR | 2936295 A1 | 3/2010 |
| JP | WO 9906881 A1 * | 2/1999 .......... G02B 6/0036 |
| WO | 0050807 A1 | 8/2000 |

* cited by examiner

OPTICAL WAVEGUIDE WITH A REFLECTIVE PATTERN FOR PROPAGATING A LIGHT BEAM

CROSS-REFERENCE TO RELATED APPLICATIONS

This application is the U.S. National Phase application of PCT Application No. PCT/EP2014/060479 filed May 21, 2014, which claims priority to the French application 1354570 filed on May 22, 2013, which applications are incorporated herein by reference and made a part hereof.

BACKGROUND OF THE INVENTION

1. Field of the Invention

The present invention relates to an optical waveguide and its use in a lighting device equipping a motor vehicle, in particular an automotive vehicle.

2. Description of the Related Art

The use of optical waveguides is becoming increasingly common in the field of automotive vehicle lighting and signalling. In fact, these have the advantage of being able to adopt highly varied geometric forms and to create an illuminating surface even in less accessible regions of the lighting and/or signalling device. This is particularly beneficial in the present context, where the designers of motor vehicles are seeking to impart a unique signature to their vehicles, in particular by proposing complex shapes for the headlights, which are also referred to as headlamps.

The expression "optical waveguide" is used in the present application to denote a transparent or translucent component, in the interior of which light beams are propagated in a controlled manner from one of the extremities of the waveguide, referred to as the input face, to at least one output face. The propagation of the light in a controlled manner is generally performed by successive total reflections on various internal reflection faces to the optical waveguide.

In practical terms, at least one light source is disposed close to the input face, for example a light-emitting diode. The light beams emitted by the source will be propagated in the optical waveguide towards the face opposite the input face, referred to as the end face, by means of parallel internal reflection faces situated between the input face and the end face.

In certain optical waveguides, the light beams may be directed in the direction of a different secondary output face from the end face, in such a way that an observer then has the impression that the secondary output face is illuminated directly by a light source. According to certain modes of implementation, for example as described in application FR 2 891 891, which is equivalent to U.S. Publication 2007/0121334, which is issued as U.S. Pat. No. 7,726,854, the output face is in particular one of the internal reflection faces. For this purpose, the shape of a first internal reflection face is modified so that it is no longer parallel to the second internal reflection face, such that the incident beams, as they meet the first face in the area of this interruption, are directed onto the second internal reflection face with an angle of incidence such that, instead of being reflected on this second internal reflection face, the beams pass through it and exit from the waveguide. These modifications to the shape of the first internal reflection face may be obtained by the provision of prisms, as described in application FR 2 891 891. It has been observed that such optical waveguides including prisms make it possible to obtain the emission of an anisotropic light oriented in the axis of the vehicle. Although such a design approach is advantageous in that it permits compliance with photometric standards, the designers of motor vehicles also wish to propose visually pleasing lighting and/or signalling devices, in particular by a uniform illuminated appearance regardless of the position in which an observer views the vehicle, both in the longitudinal axis of the vehicle and from the side.

Also familiar, furthermore, is the patent application published under number WO 00/50807, which is published in the U.S. under the following publication and patent numbers: US2011222310 (A1) U.S. Pat. No. 8,123,393 (B2) US2005007759 (A1) U.S. Pat. No. 7,322,730 (B2) US2004165372 (A1); U.S. Pat. No. 7,160,015 (B2); US2010172151 (A1); U.S. Pat. No. 7,963,687 (B2); US2004080927 (A1); U.S. Pat. No. 7,004,611 (B2); US2007147087 (A1); U.S. Pat. No. 7,434,973 (B2); US2007133224 (A1); U.S. Pat. No. 7,404,661 (B2); US2004012946 (A1); U.S. Pat. No. 7,195,389 (B2); US2007103933 (A1); US2007153549 (A1); U.S. Pat. No. 7,537,370 (B2); US2006274555 (A1); U.S. Pat. No. 7,703,967 (B2); US2006274554 (A1); U.S. Pat. No. 7,467,887 (B2); US2006262567 (A1); US2006232965 (A1); U.S. Pat. No. 7,404,660 (B2); US2003202338 (A1); U.S. Pat. No. 7,077,544 (B2); US2006158906 (A1); U.S. Pat. No. 7,434,974 (B2); US2003123247 (A1); U.S. Pat. No. 6,749,312 (B2); US2003123246 (A1); US2003123245 (A1); U.S. Pat. No. 7,226,196 (B2); US2002141174 (A1); U.S. Pat. No. 6,712,481 (B2); US2006028843 (A1); U.S. Pat. No. 7,300,194 (B2); US2006028841 (A1); US2006028840 (A1); U.S. Pat. No. 7,736,043 (B2); US2006028817 (A1); U.S. Pat. No. 7,384,177 (B2); US2006028844 (A1); US2003007344 (A1); U.S. Pat. No. 6,755,547 (B2); US2005213349 (A1); U.S. Pat. No. 7,357,553 (B2); US2005207178 (A1); U.S. Pat. No. 7,165,873 (B2); US2005213323 (A1); US2005213322 (A1); U.S. Pat. No. 7,374,305 (B2); US2005207154 (A1); U.S. Pat. No. 7,354,184 (B2); US2005111238 (A1); US2005111241 (A1); U.S. Pat. No. 7,178,965 (B2) and US2005094418 (A1), which discloses illuminated panels including an optical waveguide in the form of a panel and which includes on one of its faces a distribution of patterns (indented or raised) that are integral with the face. The different embodiments of the patterns proposed in this document ensure an anisotropic illumination, and certain of them ensure an illumination which is also uniform. However, if the described solutions are adapted in particular for the production of phototherapy appliances or to provide backlighting for a display screen, they would not then be suitable for the production of curved optical waveguides for automobile lighting and/or signalling devices, which guides are in addition inclined in relation to the frontal plane perpendicular to the optical axis of the device, that is to say to a vertical plane, the optical axis being substantially parallel to the horizontal, and which moreover would meet the mandatory photometric standards.

SUMMARY OF THE INVENTION

In this context, the invention proposes an alternative to the lighting devices for motor vehicles, in which an optical waveguide permits illumination which is both uniform and anisotropic, and which makes it possible to design devices that are curved and are also inclined in relation to the frontal plane in the optical axis of the devices. This alternative should also be easy to accomplish and inexpensive.

The invention proposes an optical waveguide for the propagation of a light beam designed to travel by successive total reflections off the faces of the optical waveguide to an output face where the beam is refracted, in which one of the faces forms, facing towards the output face, a support face for a pattern extending across the main direction of the beam to divert same towards the output face. According to a characterizing feature of the invention, the pattern is a bifunctional reflective pattern that is integral with the support face and combines the means for the implementation of a focused reflection of the beam towards the output face and the means for the implementation of a multidirectional reflection of this same beam.

Two distinct effects are thus combined in a pattern that is integral with one of the faces of the optical waveguide. Efficient illumination is permitted in the axis of the vehicle in order to meet the photometric standards, by concentrating the beam on a given point, and diffusion of the light in all directions is permitted at the same time in order to ensure that the general appearance of the illumination is coherent and uniform, regardless of whether the vehicle is being observed from the front or from the side.

The use of the expression "integral with" in the present application is intended to denote that the patterns are produced directly in the optical waveguide, in the mass, or that they emerge therefrom, as opposed to patterns that are applied to the optical waveguide, for example by means of an adhesive film covered with the patterns.

In one particularly advantageous mode of implementation of the invention, the bifunctional reflective pattern has three successive portions including end portions formed by cone portions, between which there is interposed an intermediate portion having plane or curved faces. The double reflection function is accomplished by connecting together two geometries having different optical benefits. The intermediate portion permits the light beam to be concentrated on a precise zone of the output face, whereas the cone portions assure the multidirectional reflection.

According to a characterizing feature of a first mode of implementation of the invention, the intermediate portion includes two facets, both plane and non-parallel, which meet at a top edge, in such a way as to have a triangular section. The facets are symmetrical to one another in relation to the plane perpendicular to the support face for the patterns and passing through the top edge. This symmetry is particularly beneficial for the method of manufacture of the invention. According to a characterizing feature of a second embodiment of the invention, the intermediate portion includes two dissymmetrical curved facets which meet at a curved top edge. According to a characterizing feature of the invention, the facets are inclined in relation to the horizontal plane in two directions. On the one hand they are inclined by rotation through a defined angle about an axis parallel to the support face, and, on the other hand they are inclined by rotation through a defined angle about an axis perpendicular to the support face. According to the calculated angles of inclination, the top edge of the intermediate portion is then not parallel to the support face for the patterns. The facets thus have a slope adapted to reflect the beams to enable them to meet the output face, on the one hand with the desired vertical component, and on the other hand with the desired transverse component, in order to be refracted and directed at the outlet from the optical waveguide in the desired optical direction. It should be noted that the orientation of the top edge will be particularly considered for the method of manufacture of the invention.

In one particular arrangement of the invention, the support face includes a plurality of bifunctional patterns placed side by side forming a line in a transverse direction to the main direction of travel of the light beam in the guide. In the event that the support face were to include several lines of patterns, it is of benefit, furthermore, for the patterns as a whole to be disposed in a staggered fashion.

It is also possible to propose that the support face in addition includes patterns having shapes that are different from those of the previously mentioned bifunctional patterns, and, for example, patterns adopting the form of cones, of which the axis is normal to the support face for the patterns.

According to the characterizing features of a preferred mode of implementation of the invention, the optical waveguide is formed by a sheet of transparent material which has the form of a parallelepiped including in particular two main faces which are substantially parallel to each other, and of which one forms the output face and the other the support face, as well as a proximal edge adapted to receive a light source, of the light-emitting diodes type, which transmits light into the thickness of the optical waveguide, and a distal edge, which constitutes the extremity opposite the proximal edge and which has a coating or a specific geometric profile permitting the light beam to be directed in the optical waveguide.

The presence of this coating has a significant impact on the illuminated appearance of the waveguide: it makes it possible on the one hand to recover the light, which has a tendency to escape from the waveguide via the distal edge, and it also makes it possible to direct the light beams with a high angle of incidence, which will encourage the exit of the light beam in a desired direction, as described below.

The invention also relates to a lighting device for a motor vehicle, including a cover lens and a light source, as well as an optical waveguide for the propagation of a light beam. An output face of the optical waveguide, being smooth and continuous, is disposed facing towards the cover lens, while a parallel face includes bifunctional reflective patterns forming an interruption in the regular profile of the support face, the patterns having three portions, including end portions, formed by cone portions, between which there is interposed an intermediate portion having plane faces.

The lighting device for a motor vehicle may be:

a device for illuminating the road, which is also referred to as an illuminating device (the use of the expressions "illuminating device", in the absence of indications to the contrary, denotes a device for illuminating the road); for example a front headlight of a motor vehicle, which is also referred to as a headlamp, a device for signalling, for example a direction indicator, or a rear position lamp, or even a daytime signalling lamp, which is also referred to as a DRL (for "Day Running Light"), an interior lighting device, namely a device in the interior of the passenger compartment of the vehicle, for the purpose of illuminating the latter or to provide background illumination.

According to a characterizing feature of the invention, the cover lens has a curvature in the transverse direction which the optical waveguide follows. The support face of the waveguide has at least one line of bifunctional patterns, and the inclination of the intermediate portion of the patterns varies from one pattern to the other along one and the same line.

Finally, a description is given of a method of manufacturing an optical waveguide for the propagation of a light beam including bifunctional reflective patterns that are integral with one of the faces of the optical waveguide. As a first step, a flat plate is deformed in order to obtain reliefs corresponding to the shapes of the bifunctional patterns and to their desired arrangement in lines and in a staggered fashion. This deformation is performed by means of a single tool, in the form of a cone. The tool is pressed into the plate in order to form a conical impression, and the tool is then displaced according to a director in a given direction, the director being curved or straight. The resulting plate is then placed in the mold, for example by orienting the reliefs towards the interior of the mold, and the material is injected. The guide is then formed by this injected material. The complex patterns that are integral with the support face are thus realized advantageously in this way with little tooling. The same tooling may be used to produce patterns on the different slopes, by the calculation in advance of the director which the tool must follow in the form of a cone. This process may be used advantageously in order to form a guide according to the present invention.

These and other objects and advantages of the invention will be apparent from the following description, the accompanying drawings and the appended claims.

BRIEF DESCRIPTION OF THE ACCOMPANYING DRAWINGS

The invention will now be described more fully within the context of preferred characterizing features and their advantages, with reference to FIGS. 1 to 8, in which.

DETAILED DESCRIPTION OF THE PREFERRED EMBODIMENTS

The expression "longitudinal direction" L is used below to denote the direction of driving of the automotive vehicle, and "transverse direction" T to denote a direction that is horizontal and perpendicular to the longitudinal direction. The vertical direction V designates the direction perpendicular to the two preceding directions, which also define a horizontal plane. The trihedron L,V,T is placed on certain figures for ease of reading.

Figure 1:
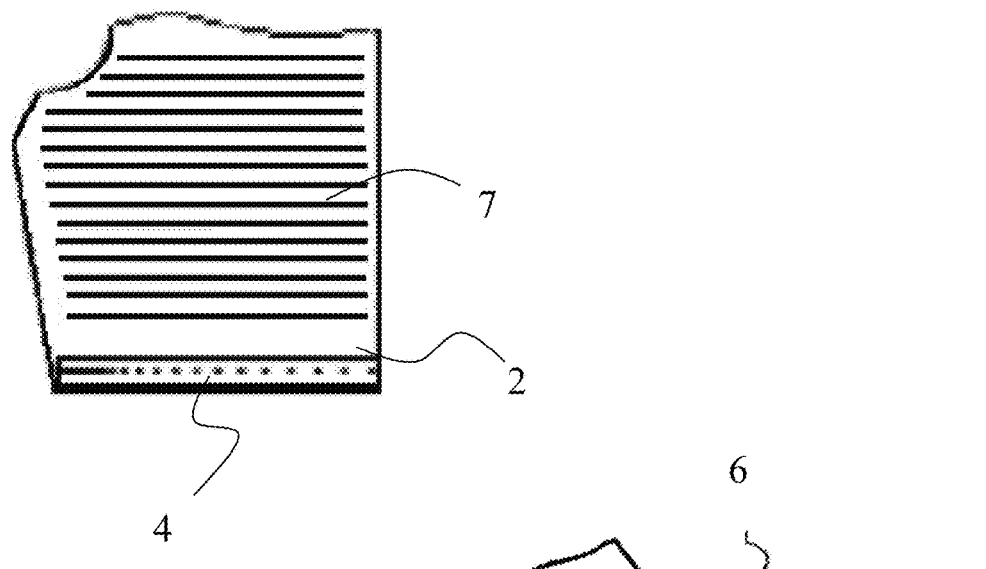
FIG. 1 represents schematically a headlight of a motor vehicle, of which a lens can be seen, onto which lines of light spaced apart by a few millimeters are projected, an array of light-emitting diodes being disposed inside the headlight.

A lighting and signaling device is represented in FIG. 1. In this case, this is a headlight of a motor vehicle which includes a cover lens 2 and which likewise includes a light source 4.

The light source 4 emits a light beam 20 in the interior of the headlight and an optical waveguide 6 is disposed in the interior of the headlight in order to receive and propagate the light beam 20 to an output face 8 of the optical waveguide 6 situated facing towards the cover lens 2. The optical waveguide 6 is configured with the aim of following the shape of the cover lens 2.

Figure 2:
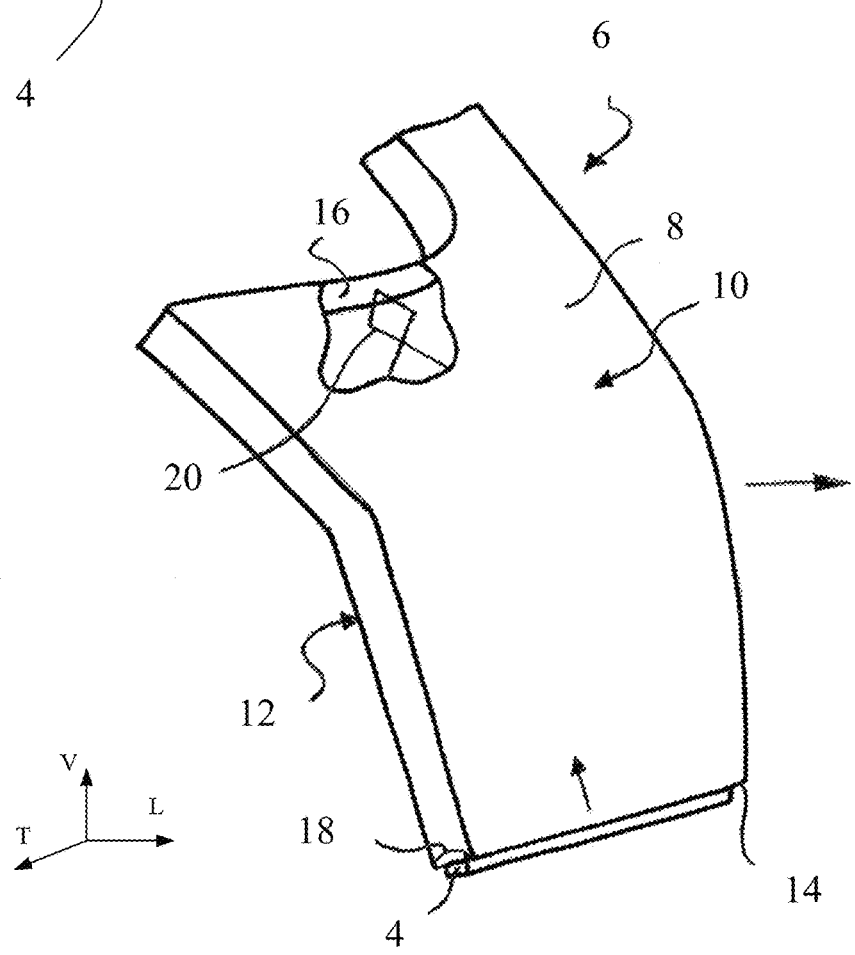
FIG. 2 illustrates in perspective a mode of implementation of an optical waveguide adapted to be housed in the headlight, the arrows representing the path of a light beam emerging from a light source disposed at the extremity of the waveguide and refracted from the waveguide via its output face in order to be projected onto the cover lens.

FIG. 2 depicts a view in perspective and in section of a sheet forming an optical waveguide 6 intended to propagate a light beam 20 emitted by the light source 4 from one extremity close to the light source 4 to an opposite extremity.

The light source 4 may consist of a series of light-emitting diodes which transmit light into the thickness of the optical waveguide 6, where it is trapped thanks to the total internal reflection between the faces of the sheet constituting the optical waveguide 6.

The sheet has the form of a parallelepiped, which is substantially plane or curved. The faces of the sheet each form a diopter separating the air from the interior of the sheet made from a transparent material. It is possible to distinguish in particular two main faces 10 and 12, which are substantially parallel to each other, as well as a proximal edge 14, against which the light source 4 is disposed, and a distal edge 16, which constitutes the edge opposite the proximal edge 14, and which lacks a light source 4 in this case. A second light source on the distal edge 16 could be proposed as a variant.

The proximal edge 14 has cavities 18, each being adapted to receive a diode head of the light source 4, so as to exploit to a maximum the luminous flux emitted by the diodes. It will be appreciated that the receiving cavities 18 may adopt different forms and a different number according to the modes of implementation. A plurality of these cavities 18 may be proposed, each being intended to house a diode, or only a single continuous cavity, for example having the form of a portion of a cylinder, intended to accommodate several diodes in alignment. The respective dimensions and the forms of the cavities 18 and the diode heads are preferably complementary, with sufficient clearance for the diodes to be capable of being housed easily in the cavities 18.

The light beams emitted from the light source 4 disposed on the proximal edge 14 move towards the distal edge 16. The latter has a coating or a specific geometric profile permitting the light beams 20 to be directed into the optical waveguide 6 in the direction of the proximal edge 14, as can be seen in FIG. 2 in the cut-out portion.

Figure 3:
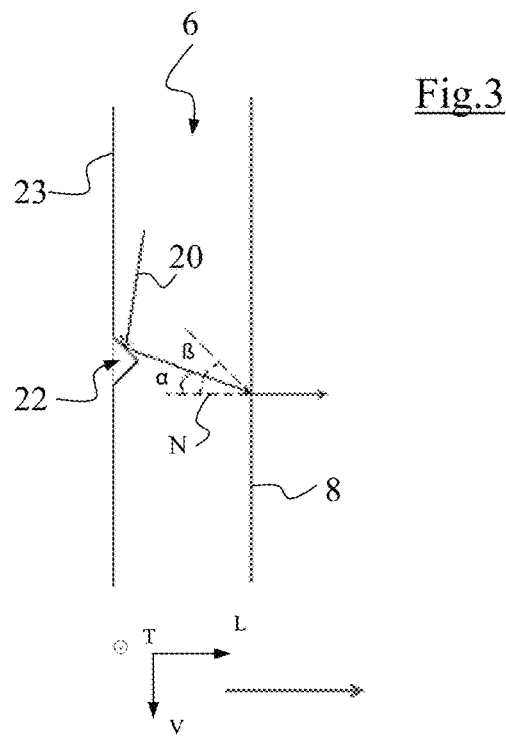
FIG. 3 is a sectional view in a vertical and longitudinal plane of a front section of the optical waveguide, partially illustrating the course in the corresponding plane adopted by the light beam that is channeled in the guide.

FIG. 3 represents in section the optical waveguide 6 in a vertical and longitudinal plane so as to illustrate the condition under which the light beam 20 emitted by the light source 4 is conducted in the optical waveguide 6. In a general sense, the light beam 20 progresses through the thickness of the sheet by successive total reflections off the main faces of the sheet, between the proximal edge 14 and distal edge 16. The total reflections are interrupted when the light beam 20 meets patterns 22 that are disposed in a projecting manner from one of the faces of the sheet. It can be appreciated in FIG. 3 that the sheet forms a light guide in which the admitted light beams 20 are channeled. For this to happen, the sheet forming the optical waveguide 6 is constituted by a transparent material which has a higher index of refraction than the index of refraction of the environment, for example the air, in which the sheet is immersed. It is proposed here to produce the optical waveguide 6 from a transparent polymer in the form of a polycarbonate, preferably of crystal quality. In an arrangement of this kind, where the indices of refraction of the environments traversed by the light beams 20 are known, it is possible to determine by calculation a defined threshold angle ß in relation to the normal to the point of incidence, to which reference is made in order to establish whether the incident beam as it arrives on the guide face will be reflected in its totality or will be contained within the refracted portion.

Each light beam 20 arrives at an output face 8 of the transparent sheet at an angle α in relation to the normal to the point of incidence N. When the angle α is smaller than the defined threshold angle ß, the light beam 20 is refracted outside the optical waveguide 6. And when the angle α is greater than this defined threshold angle ß, the light beam 20 is reflected totally in the interior of the optical waveguide 6, and as a result it is propagated in the optical waveguide 6 by successive total reflections off the faces of the sheet.

According to the invention, the optical waveguide 6 is configured so that the light beam 20, as it exits via the output face 8, produces horizontal lines 7 on the cover lens, as can be seen in FIG. 1.

The output face 8 is formed by one of the main faces of the sheet. The first face is disposed facing towards the cover lens of the headlight. It is smooth and continuous. The second face or support face 23 extends parallel to the first face, and it differs from the latter by being a support face 23 for reflective elements forming an interruption in its regular profile. The reflective elements are patterns, projecting from the second face 23, which act as a secondary optical source by constituting internal reflection faces other than those of the optical waveguide 6, onto which an incident light beam 20 is capable of being reflected.

As shown in FIG. 3, the incident light beams 20 which meet the patterns formed in this way are directed towards the first face, which they reach at an angle α smaller than the threshold angle ß. The incident light beams 20 are thus refracted via the output face 8 formed by the first face, and they are directed towards the cover lens of the headlight in the plane of incidence defined by the incident light beam 20 and by the normal to the point of incidence.

The patterns formed on the optical waveguide 6 include at least one bifunctional reflective pattern 24, which has conical end portions 26 between which there is interposed an intermediate portion 28 having plane faces.

Figure 6:
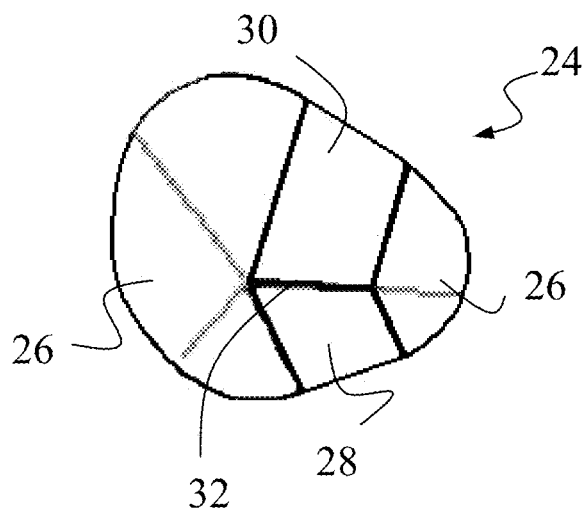
FIGS. 6 and 7 illustrate, in a perspective view and in a view from the side, a reflective pattern according to the invention, which includes two portions of a cone between which there is interposed an intermediate portion.
Figure 7:
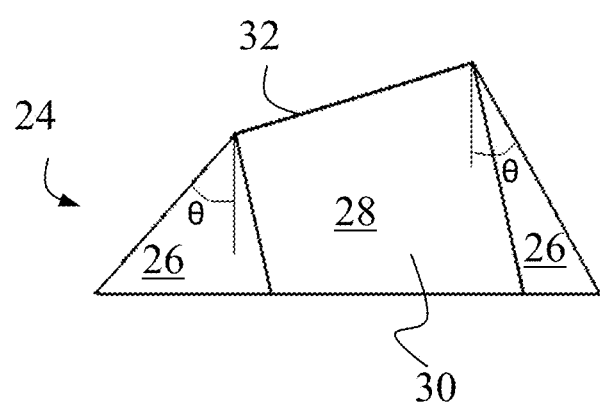

In a first mode of implementation, as illustrated in FIGS. 6 and 7, the intermediate portion 28 includes two facets 30, both plane and non-parallel, that meet at a top edge 32 in such a way that it has an isosceles triangular section in the vertical plane perpendicular to the second face 23, the facets in this case being symmetrical in relation to the plane perpendicular to the second face 23 and passing through the top edge 32.

The dimension of the facets 30 is determined according to the dimension of the optical waveguide 6 and the calibration of the light beam 20 circulating within the optical waveguide 6. By way of example, they have a depth of approximately 0.25 mm and a width of approximately 1 mm. The patterns advantageously have the same dimensions, in particular with a view to the simplification of the manufacturing tools.

The facets 30 of the intermediate portion 28 have a slope calculated to permit the incident light beams 20 to be reflected in a preferred direction. The slope is visible in particular in FIGS. 6 and 7. The directivity of the luminous flux emitted by the light-emitting diodes permits the calculation of the course of a principal number of beams, represented in FIG. 5 by the light beam 20, and the identification in this way of the angle of incidence of the light beam 20 when it meets one of the bifunctional reflective patterns 24. In this context, a calculation is made of the inclination of the intermediate portion 28 required for the light beam 20 that is reflected on this intermediate portion 28 to arrive on the output face 8 of the optical waveguide 6 at the angle necessary for the refracted beam to exit properly from the headlight, that is to say in the optical axis and substantially horizontally, in the case illustrated in FIGS. 3 and 4.

The facets 30 are inclined on the one hand in relation to the horizontal plane by an angle defined by calculation about an axis parallel to the support face 23 for the bifunctional reflective patterns 24.

The inclination, which is visible in FIG. 3, permits the shallow light beam 20 grazing the support face 23 to be directed in the direction of the output face 8. The degree of inclination of the facet 30 is calculated in order that the reflected light beam 20 meets the output face 8 and at a suitable angle of incidence for the good refraction of the light beam 20 via the diopter formed by the output face 8 of the optical waveguide 6. In the plane depicted in FIG. 3, the angle of incidence of the shallow light beam 20 in relation to the vertical before it meets the facet 30 of the pattern is known, and the angle in relation to the horizontal that it is wished to impart to the refracted light beam 20 via the output face 8 is also known, with the result that a design rule allows the slope to be imparted in this plane to the facet 30 of the bifunctional reflective pattern 22 to be determined as a function of the indices of refraction of the air and of the material of the optical waveguide 6.

On the other hand, the facets 30 are likewise inclined in relation to the horizontal plane by rotation about an axis normal to the support face 23 for the bifunctional reflective patterns 24.

Figure 4:
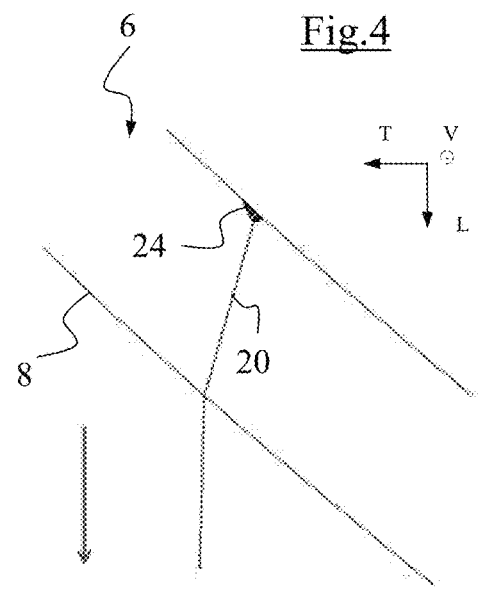
FIG. 4 is a sectional view in a transverse and longitudinal plane of a front section of the optical waveguide, partially illustrating the course in the corresponding plane adopted by the light beam that is channeled in the guide.

The angle of rotation is determined by calculation in order that the inclination in this plane, as depicted in FIG. 4, permits the reflection of the shallow light beam 20, directed perpendicularly to the plane in FIG. 4, having a transverse component in relation to the normal to the support face 23. This directs the reflected light beam 20 towards the adequate point of incidence on the output face 8, such that the refracted light beam 20 is directed in the optical axis.

It will thus be appreciated that any bifunctional reflective patterns 24 that are disposed on the first support face 23 when the latter is only frontal, that is to say perpendicular to the direction of driving of the vehicle, do not require to be inclined in relation to the horizontal plane and about an axis normal to the support face 23 for the bifunctional reflective patterns 24, the plane of incidence in which the light beams 20 are reflected and refracted naturally being parallel to the optical axis.

The conical portions 26 are disposed to either side of the intermediate portion 28 so as to reflect the light beams 20 in all directions and to assure a radiation function which the intermediate portion 28 does not perform. The conical portions 26 are formed by cone portions, of which the base is combined with the support face 23 of the optical waveguide 6, and of which the top is formed by the corresponding extremity of the edge of the intermediate portion 28. The two portions of a cone that are disposed to either side of the intermediate portion 28 have the same angle at the top 8 (as illustrated in FIG. 7), which, as described below, allows the use of the same conical tool for the method of manufacturing the optical waveguide 6. It will be noted that, because of the two inclination components of the facets 30, the top edge 32 is not parallel to the face of the optical waveguide 6 acting as a support for the bifunctional reflective patterns 24. The conical portions 26 thus have different diameters. It will be appreciated that, if the calculations of the inclination of the intermediate portion 28 were to lead to the portion being designed with a top edge 32 parallel to the support face 23, in particular in the case where the optical waveguide 6 is plane and extends perpendicularly to the optical axis, portions of complementary cones, having equivalent dimensions could be disposed to either side of the intermediate portion 28.

Figure 9:
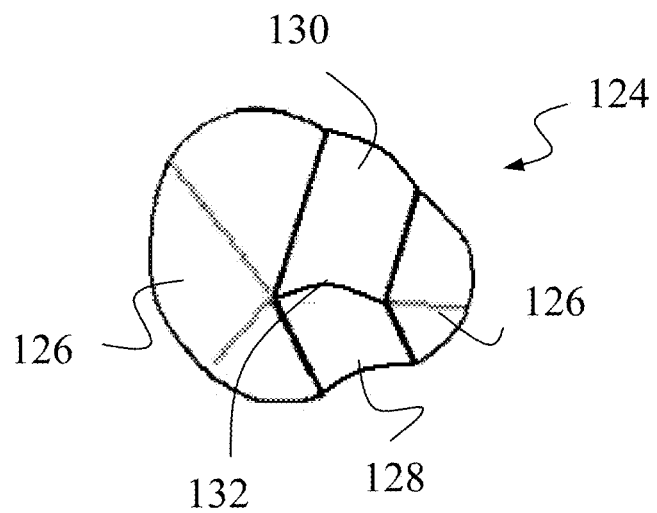
FIG. 9 illustrates, in a view similar to that in FIG. 6, a reflective pattern according to a second mode of implementation of the invention.

In a second mode of implementation, illustrated in FIG. 9, in which the same references, to which 100 has been added, are retained for the description of the equivalent elements, the bifunctional reflective pattern 124 has conical end portions 126, between which there is interposed an intermediate portion 128, which comprises two curved facets 130 which meet at a top edge 132. The curved facets are dissymmetrical, and the top edge 132 which connects them to their extremity opposite the support face for the bifunctional reflective patterns 124 likewise has a curved profile.

Figure 8:
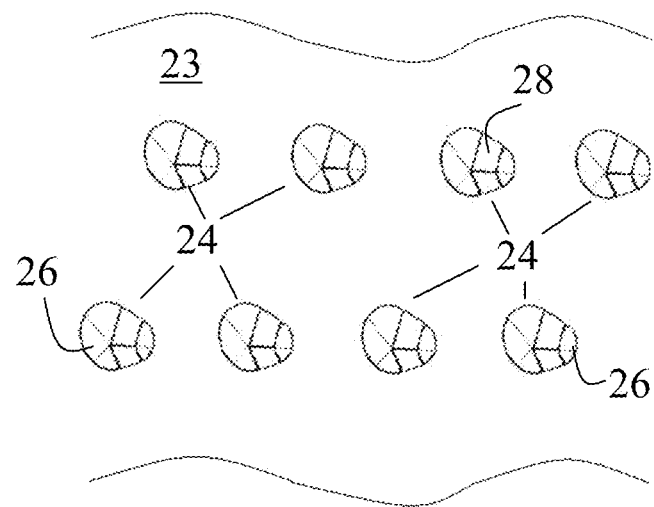
FIG. 8 illustrates a surface of an optical waveguide on which several lines of reflective patterns according to FIG. 6 are disposed in a projecting manner.

In these two previously described modes of implementation, as illustrated in FIG. 8, it is proposed to position the bifunctional reflective patterns 24 alongside each other forming a line which extends along the transverse axis. The number of lines of bifunctional reflective patterns 24 that are formed on the support face 23 for the patterns of the optical waveguide 6 is the same as the number of horizontal lines of light that it is wished to obtain at the output from the headlight.

When several lines of bifunctional reflective patterns 24 are proposed, an arrangement of the lines can be provided advantageously on the support face 23, such that the bifunctional reflective patterns 24 are disposed in a staggered fashion. It will thus be appreciated that a shallow light beam 20 may pass between two patterns on one and the same line without being reflected before coming into contact with a pattern on the following line.

Figure 5:
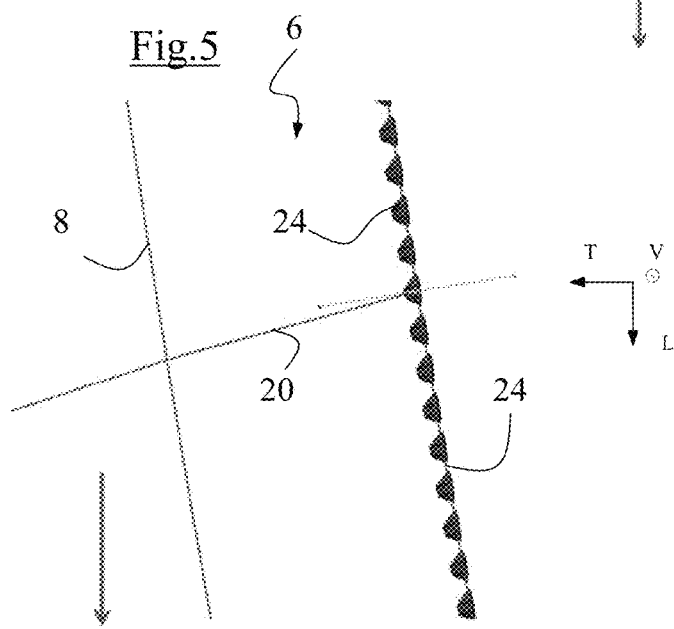
FIG. 5 is a sectional view similar to that in FIG. 4, for a lateral section of the optical waveguide.

As illustrated in FIGS. 4 and 5, the headlight may be curved and it may have a frontal portion and a lateral portion. The sheet forming the optical waveguide 6 then follows this curvature in order that the output face 23 of the optical waveguide 6 is situated facing towards the cover lens in a continuous manner. The orientation of the facets 30 of the intermediate portion 28 of the bifunctional reflective patterns 24 is calculated in order that the light is directed progressively in a direction other than the longitudinal optical axis, although still in the horizontal continuity of the luminous line of light, in order to maintain a continuity of the illuminated appearance when turning around the vehicle.

The method of manufacturing the optical waveguide 6, as described above, with bifunctional reflective patterns 24 that are integral with one of the faces of the optical waveguide 6 is described below. The bifunctional reflective patterns 24 may be obtained directly during the molding of the optical waveguide 6 by providing the mold with appropriate reliefs, the expression relief being used here in a generic sense and serving to designate a raised or indented formation.

As a first step, a flat plate is machined so that it includes, on completion of the machining process, reliefs corresponding to the shapes of the bifunctional reflective patterns 24 and to their arrangement in a line and in a staggered fashion.

The machining is carried out advantageously with a single tool, in the form of a cone. The plate is deformed by insertion of the tool in such a way as to form a first conical portion, and the tool is then displaced according to a director in the same direction as that of the edge of the intermediate portion 28 of the pattern. If the top is intended to be parallel to the support face 23 for the bifunctional reflective patterns 24, the tool is displaced laterally without variation in the depth, whereas, if it is intended that the pattern has a sloping top, the depth of insertion of the tool is varied during its lateral displacement. Similarly, if it is wished to obtain bifunctional reflective patterns 24 according to the first embodiment, with an intermediate portion 28 having plane faces, the tool is displaced laterally in a straight line, whereas it is displaced laterally according to a curved director if it is wished to obtain bifunctional reflective patterns 24 according to the second embodiment, with an intermediate portion 28 having curved faces.

The lateral displacement of the tool generates the intermediate portion 28, with two facets 30 being produced to either side of the plane perpendicular to the plate. When the tool is stopped, its conical form instantly generates the second conical portion.

The plate is then placed in the mold while orienting the reliefs towards the interior of the mold, and the material is injected. In this way, the bifunctional reflective patterns 24 produced in negative format on the plate will then be produced in positive format, that is to say in embossed format, on the injected component. An angle at the top of the intermediate portion 28 that is sufficiently open for the demolding operation will have been arrived at by calculation.

The above description explains clearly how the invention permits the objectives that it has set for itself to be achieved and, in particular, makes it possible to propose a lighting device for a motor vehicle that is particularly effective. By connecting together two geometries having different optical benefits, that is to say by combining the prismatic and conical forms on one and the same pattern, efficient illumination is permitted in the axis of the vehicle in order to meet the photometric standards, by calculating the inclination of the prismatic surfaces in order to direct the light in the desired direction against the opposite face of the optical waveguide 6 so that it is able, after refraction, to exit from the headlight in the axis of the vehicle, and along parallel lines that are spaced apart by a few millimeters. At the same time, diffusion of the light in all directions is permitted when the light beam 20 meets the conical zone, such that the general appearance is coherent and homogeneous, regardless of whether the vehicle is being observed from the front or from the side.

It is also possible to apply the optical waveguide 6 according to the invention in a particular embodiment of a lighting device for a motor vehicle, although this is not represented here. The headlight has a symmetrical form in relation to a central axis, on which the light source 4 is disposed, and the distal edge 16 of each half headlight is disposed facing towards the other distal edge 16, by having each of the cavities for receiving a common light source 4 disposed between the two distal edges 16. If this arrangement is clearly of benefit for the optimization of the light sources 4, it is beneficial in the context of the invention in that lines of light can be produced to either side of the row of light-emitting diodes forming the light source 4 by reducing by two the number of calculations necessary for the shape and the orientation of the bifunctional reflective patterns 24.

In a variant that is not represented here, reflective elements are added to the support face 23 for the bifunctional reflective patterns 24 of the optical waveguide 6, which adopt the form of simple cones, of which the axis is normal to the support face 23. The diffusion of the light in all directions is increased in this way. The cones may be disposed in a line parallel to the line of the bifunctional reflective patterns 24 described above, for example alternately, or they may be positioned between two successive bifunctional reflective patterns 24 on one and the same line. Depending on whether it is wished to place the emphasis on perfect photometry, or on a strong visual signature that is clearly visible on the sides, a more or less simple cone will be available between the bifunctional reflective patterns 24.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical waveguide for the propagation of a light beam comprising: an output face through which said light beam is refracted; and a support face for a pattern extending across a main direction of said light beam to divert said light beam towards said output face, wherein said pattern is a bifunctional reflective pattern in that it combines focused reflection of said light beam towards said output face with multidirectional reflection of said light beam, said bifunctional reflective pattern being integral with said support face and comprising elements having three portions including a pair of conic end portions between which there is interposed an intermediate portion that comprises a pair of facets that meet at a top edge, said top edge connecting apexes of said conic end portions, said conic end portions having like apex angles and respective bases at said support face so that said top edge of said intermediate portion is inclined relative to said support face, wherein said pair of facets are non-parallel to each other along the support face.

2. The optical waveguide as claimed in claim 1, wherein said facets have planar faces.

3. The optical waveguide as claimed in claim 2, wherein said facets are symmetrical to one another relative to a plane perpendicular to said support face.

4. The optical waveguide as claimed in claim 1, wherein said facets have curved faces.

5. The optical waveguide as claimed in claim 4, wherein said facets are dissymmetrical curved facets meeting at a curved top edge.

6. The optical waveguide as claimed in claim 1, wherein said support face includes a plurality of said bifunctional reflective pattern elements placed side by side forming a line in a transverse direction to the main direction of travel of said light beam in said optical waveguide.

7. The optical waveguide as claimed in claim 6, wherein said support face includes several lines of said bifunctional reflective pattern elements and wherein said bifunctional reflective pattern elements are disposed in a staggered fashion.

8. The optical waveguide as claimed in claim 1, wherein said of cones of said conic end sections have respective axes that are normal to said support face.

9. The optical waveguide as claimed in claim 1, wherein said optical waveguide has the form of a parallelepiped including a pair of opposing faces which are substantially parallel to each other and of which one of said faces forms said output face and the other of said faces forms said support face, the optical waveguide further including a proximal edge adapted to receive a light source which transmits light into said optical waveguide, and a distal edge which has a coating or a geometric profile permitting said light beam to be directed in said optical waveguide.

10. A lighting device for a motor vehicle comprising: a cover lens, a light source, an optical waveguide for the propagation of a light beam, the optical waveguide comprising: an output face through which said light beam is refracted; and a support face for a pattern extending across a main direction of said light beam to divert said light beam towards said output face, wherein said pattern is a bifunctional reflective pattern in that it combines focused reflection of said light beam towards said output face with multidirectional reflection of said light beam, said bifunctional reflective pattern being integral with said support face and comprising elements having three portions including a pair of conic end portions between which there is interposed an intermediate portion that comprises a pair of facets that meet at a top edge, said top edge connecting apexes of said conic end portions, said conic end portions having like apex angles and respective bases at said support face so that said top edge of said intermediate portion is inclined relative to said support face; wherein said pair of facets are non-parallel to each other along the support face; wherein said optical waveguide, being smooth and continuous, is disposed facing towards said cover lens, and in which said support face extends parallel to said output face.

11. The lighting device for a motor vehicle as claimed in claim 10, in which said cover lens has a curvature and said optical waveguide follows said curvature, said bifunctional reflective pattern being disposed on said support face in lines of said bifunctional reflective pattern elements, the inclination of said intermediate portion of said bifunctional reflective pattern elements varying along one of said lines.

12. An optical waveguide for use with a lighting device for a motor vehicle, said optical waveguide comprising an output face which is smooth and continuous, disposed facing towards a cover lens, and in which a support face extends parallel to the output face, the support face differing from the output face in that the support face includes a bifunctional reflective pattern of elements having three portions including a pair of conic end portions between which there is interposed an intermediate portion having plane or curved faces meeting at a top edge, said top edge connecting apexes of said conic end portions, said conic end portions having like apex angles and respective bases at said support face so that said top edge of said intermediate portion is inclined relative to said support face, wherein said pair of faces are non-parallel to each other along the support face.

13. The optical waveguide as claimed in claim 12, wherein said faces of the intermediate portion are plane faces.

14. The optical waveguide as claimed in claim 13, wherein said intermediate portion includes two plane faces, said two plane faces being symmetrical to one another relative to the a plane perpendicular to said support face and meeting at said top edge.

15. The optical waveguide as claimed in claim 12, wherein said faces of the intermediate portion are curved faces.

16. The optical waveguide as claimed in claim 15, wherein said curved faces of the intermediate portion are two dissymmetrical curved faces, which meet at said top edge in a curve.

17. The optical waveguide as claimed in claim 12, wherein said support face includes a plurality of said bifunctional reflective pattern elements placed side by side forming a line in a transverse direction to a main direction of travel of a light beam in said optical waveguide.

18. The optical waveguide as claimed in claim 17, wherein said support face includes several lines of said bifunctional reflective pattern elements and wherein said bifunctional reflective pattern elements are disposed in a staggered fashion.

19. The optical waveguide as claimed in claim 2, wherein said support face includes a plurality of said bifunctional reflective pattern elements placed side by side forming a line in a transverse direction to the main direction of said light beam in said optical waveguide.

20. The optical waveguide as claimed in claim 3, wherein said support face includes a plurality of said bifunctional reflective pattern elements placed side by side forming a line in a transverse direction to the main direction of said light beam in said optical waveguide.

21. The optical waveguide as claimed in claim 2, wherein said conic end portions of said bifunctional reflective pattern elements have respective axes that are normal to said support face.

22. The optical waveguide as claimed in claim 3, wherein said conic end portions of said bifunctional reflective pattern elements have respective axes that are normal to said support face.

* * * * *